United States Patent
Fenkes et al.

(10) Patent No.: US 9,401,873 B2
(45) Date of Patent: Jul. 26, 2016

(54) FIBRE CHANNEL OVER ETHERNET (FCOE) ZONING IN A DISTRIBUTED ETHERNET SWITCH

(71) Applicant: International Business Machines Corporation, Armonk, NY (US)

(72) Inventors: Joachim Fenkes, Tübingen (DE); Henry J. May, Cedar Falls, IA (US); Christoph Raisch, Gerlingen (DE); Stefan Roscher, Stuttgart (DE); Alexander Schmidt, Schönaich (DE); Daniel Sentler, Steinbronn (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 70 days.

(21) Appl. No.: 14/277,434

(22) Filed: May 14, 2014

(65) Prior Publication Data

US 2015/0334017 A1    Nov. 19, 2015

(51) Int. Cl.
  *H04L 12/947*  (2013.01)
  *H04L 12/931*  (2013.01)
  *H04L 12/64*   (2006.01)
  *H04L 12/741*  (2013.01)

(52) U.S. Cl.
  CPC ............ *H04L 49/25* (2013.01); *H04L 12/6418* (2013.01); *H04L 45/745* (2013.01); *H04L 49/351* (2013.01)

(58) Field of Classification Search
  None
  See application file for complete search history.

(56) References Cited

U.S. PATENT DOCUMENTS 7,283,486 B2 * 10/2007 Banks ............... H04L 29/12056
                                                 370/254
8,274,993 B2    9/2012 Sharma et al.
(Continued)

FOREIGN PATENT DOCUMENTS

WO    WO 2014/011927 A1 *  1/2014
WO    WO 2014/142980    *  9/2014

OTHER PUBLICATIONS

C. DeSanti et al., "Fibre Channel Zone Server MIB," RFC 4936 (Proposed Standard), 2007, 85 pages; <http://www.hjp.at/doc/rfc/rfc.4936.html>.
INCITS xxx-201x, "Fibre Channel Backbone—6," Rev 1.25, Nov. 1, 2013, 231 pages; <http://www.t11.org/ftp/t11/pub/fc/bb-6/13-091v4.pdf>.

(Continued)

*Primary Examiner* — Kwang B Yao
*Assistant Examiner* — Adam Duda
(74) *Attorney, Agent, or Firm* — Patterson + Sheridan, LLP

(57) ABSTRACT

Systems, methods, and computer program products to perform an operation comprising, receiving a login request from an endpoint connected to first physical port of a first switch module of a distributed network switch, wherein the distributed network switch comprises a plurality of switch modules, wherein each switch module comprises a plurality of ASICs, responsive to the login request, storing, in a FCDF database, an entry comprising an identifier of the first physical port and a unique identifier of the endpoint, and responsive to receiving, from a cFCF, a zoning update comprising the unique identifier of the endpoint and an FCID for the endpoint, storing the FCID in the FCDF database entry for the endpoint, identifying a first ASIC, of the plurality of ASICs of the first switch module, connected to the first physical port, and updating a zoning table of the first ASIC to include the zoning update.

13 Claims, 6 Drawing Sheets

(56) References Cited

U.S. PATENT DOCUMENTS

| | | | | |
|---|---|---|---|---|
| 8,908,683 | B2* | 12/2014 | Eisenhauer | H04L 49/357 370/386 |
| 8,948,176 | B1* | 2/2015 | Desanti | H04L 12/28 370/351 |
| 2012/0307822 | A1 | 12/2012 | Eisenhauer et al. | |
| 2013/0028135 | A1 | 1/2013 | Berman | |
| 2013/0272302 | A1 | 10/2013 | Hathorn et al. | |
| 2014/0029609 | A1 | 1/2014 | Ayandeh | |

OTHER PUBLICATIONS

INCITS xxx-xxxx, "Fibre Channel Switch Fabric—6," Rev 1A, Nov. 26, 2013, 387 pages; <http://www.t11.org/ftp/t11/pub/fc/sw-6/13-047v2.pdf>.

Alexander Schmidt et al., "FCoE Zoning in a Distributed Ethernet Switch," presentation dated Dec. 3, 2013, 7 pages.

U.S. Appl. No. 14/481,625, entitled "Fibre Channel Over Ethernet (FCoE) Zoning in a Distributed Ethernet Switch", filed Sep. 9, 2014.

"List of IBM Patents or Patent Applications Treated as Related".

* cited by examiner

FIBRE CHANNEL OVER ETHERNET (FCOE) ZONING IN A DISTRIBUTED ETHERNET SWITCH

BACKGROUND

The present disclosure relates to computer networks, and more specifically, to Fibre Channel over Ethernet (FCoE) zoning in a distributed Ethernet switch.

Computer systems often use multiple computers that are coupled together in a common chassis. The computers may be separate servers that are coupled by a common backbone within the chassis. Each server is a pluggable board that includes at least one processor, an on-board memory, and an Input/Output (I/O) interface. Further, the servers may be connected to a switch to expand the capabilities of the servers. For example, the switch may permit the servers to access additional Ethernet networks or Peripheral Component Interconnect Express (PCIe) slots as well as permit communication between servers in the same or different chassis. In addition, multiple switches may also be combined to create a distributed network switch.

Fibre Channel (FC) can be used to connect these servers and computing resources, including connecting computer systems to storage devices such as storage area network (SAN) devices. Fibre Channel is a high speed medium primarily used for data transfer and storage, but may also be used to connect other devices, servers, printers, etc. Fibre Channel is essentially a serial data channel, often created over fiber optic cabling, that provides a logical bi-directional, point-to-point connection between a host and a device.

Traditional FCoE switches contain a single switch application-specific integrated circuit (ASIC) which control all physical ports in each switch. In such an environment, a single zoning table is implemented within the switch ASIC. The zoning table may specify pairs of endpoints, or nodes, which are permitted to communicate with each other. To program zoning updates, the FCDF firmware writes updated zoning table entries to this single table without requiring further processing. However, the standards developed for traditional FCoE switches (such as FC-BB-6 and FC-SW-6) do not provide mechanisms to update the multiple switch ASICs in a distributed Ethernet switch.

SUMMARY

Embodiments disclosed herein provide systems, methods, and computer program products to perform an operation, by, receiving a login request from an endpoint connected to first physical port of a first switch module of a distributed network switch, wherein the distributed network switch comprises a plurality of switch modules, wherein each switch module comprises a plurality of application-specific integrated circuits (ASICs), responsive to the login request, storing, in a Fibre Channel Data Forwarder (FCDF) database, an entry comprising an identifier of the first physical port and a unique identifier of the endpoint, and responsive to receiving, from a controlling Fibre Channel Forwarder (cFCF), a zoning update comprising the unique identifier of the endpoint and a Fibre Channel Identifier (FCID) for the endpoint, storing the FCID in the FCDF database entry for the endpoint, identifying a first ASIC, of the plurality of ASICs of the first switch module, connected to the first physical port, and updating a zoning table of the first ASIC to include the zoning update.

DETAILED DESCRIPTION

Figure 1:
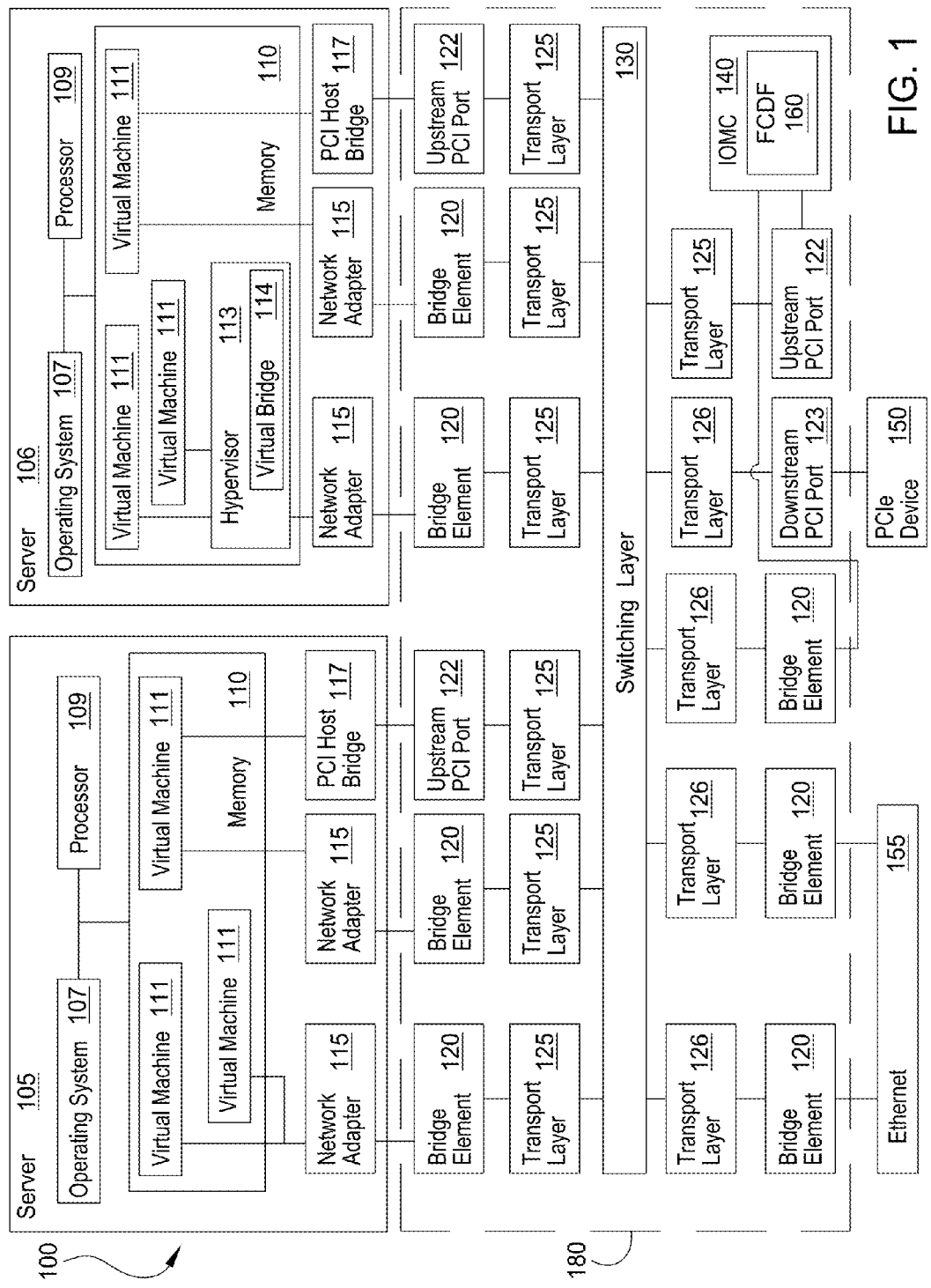
FIG. 1 illustrates a system architecture that includes a distributed network switch, according to one embodiment disclosed herein.

Embodiments disclosed herein provide mechanisms to implement a zoning protocol for Distributed Fibre Channel Forwarders (DFCF) on distributed Ethernet switches. Each switch element in a distributed Ethernet switch (also referred to herein as "distributed switch") may include multiple switch ASICs (also referred to herein as sub-switches), in contrast to the single switch ASIC in traditional FCoE switches. In addition, each switch ASIC may contain multiple zoning tables for a subset of the physical ports attached to the ASIC. Each zoning table is used for forwarding and restricting traffic between endpoints connected to the distributed switch. For example, one or more "zones" may be established in the distributed switch, such that only endpoints in the same zone are able to communicate with one another. The zoning tables in each ASIC provide access control between these endpoints. In one embodiment, for example, an entry in the zoning table specifying endpoints A and B may indicate that endpoints A and B are permitted to communicate. Absent such an entry in the zoning table, the switch ASIC will not forward (or drop) traffic between endpoints A and B. Stated differently, for example and without limitation, the zoning table allows an administrator to specify which servers can access which storage devices in a storage system.

Each switch element in the distributed switch may include an Input/Output Management Controller (IOMC) that manages and configures the switch element. The IOMC may include a Fibre Channel Data Forwarder (FCDF) which may comprise firmware to manage the zoning tables in the switch ASICs. Each distributed switch may also include a single instance of a controlling Fibre Channel Forwarder (cFCF). The cFCF maintains the complete state of the switch fabric (a switched Fibre Channel network) and each endpoint connected to the distributed switch. When new endpoints are added or removed from the distributed switch, the cFCF may send zoning updates specifying updated zoning data for each endpoint in the distributed switch. The zoning data may be used to configure the switch hardware for forwarding and restricting traffic between endpoints.

To program zoning information in the distributed switch, the FCDF needs to distribute zoning data received from the cFCF to the appropriate zoning tables. The zoning data, however, do not specify which switch ASIC stores the zoning table for the connected endpoints. As such, the Fibre Channel Backbone (FC-BB-6) and FC Switch Fabric (FC-SW-6) standards do not provide the ability to associate zoning information with ASIC-specific zoning tables, leaving it to the FCDF to determine the associations.

In order to determine the associations between zoning information received from the cFCF and ASIC-specific zoning tables, embodiments disclosed herein leverage different protocol flows (such as endpoint logins and zoning updates) to build a database within the FCDF. This database may be used to determine which switch ASICs in the distributed switch are affected by zoning updates. Specifically, when a new endpoint is connected to a port of the distributed switch, the endpoint sends a fabric login (FLOGI) request. The FLOGI frames may contain the physical source port number of the port the endpoint is connected to. In addition, a unique identifier of the endpoint, such as the world wide name (WWN) of the endpoint, is included in the FLOGI frames. According to embodiments disclosed herein, the FCDF may then create an entry in an endpoint database specifying the WWN of the new endpoint and the physical port number the new endpoint is connected to.

In response to the FLOGI request, the cFCF may respond with a zoning update that contains a new Fibre Channel Identifier (FCID) for the new endpoint. The zoning update may also specify the WWN of the new endpoint, and include zoning information specifying which other endpoints the new endpoint may communicate with. When the FCDF receives the zoning update, it may query the internal database using the new endpoint WWN to find the entry previously created for the new endpoint. The FCDF may then add the FCID to the database entry for future queries based on FCIDs. In addition, the FCDF may identify, from the database entry, which physical port the new endpoint is connected to. Based on the identified physical port, the FCDF may then identify which ASIC the physical port is connected to, and update the zoning tables for each ASIC that needs to be updated. Specifically, the FCDF updates the zoning table for the ASIC connected to the physical port the new endpoint is connected to. Similarly, the FCDF may perform lookups for each FCID of other endpoints in the zoning information that the new endpoint is permitted to communicate with. By identifying the respective ASICs these other endpoints are connected to in the FCDF database, the zoning tables of these ASICs may similarly be updated with the new zoning information.

FIG. 1 illustrates a system architecture that includes a distributed network switch, according to one embodiment disclosed herein. The first server 105 may include at least one processor 109 coupled to a memory 110. The processor 109 may represent one or more processors (e.g., microprocessors) or multi-core processors. The memory 110 may represent random access memory (RAM) devices comprising the main storage of the server 105, as well as supplemental levels of memory, e.g., cache memories, non-volatile or backup memories (e.g., programmable or flash memories), read-only memories, and the like. In addition, the memory 110 may include memory storage physically located in the server 105 or on another computing device coupled to the server 105.

The server 105 may operate under the control of an operating system 107 and execute various computer software applications, components, programs, objects, modules, and data structures, such as virtual machines 111.

The server 105 may include network adapters 115 (e.g., converged network adapters, or CNAs). A converged network adapter may include single root I/O virtualization (SR-IOV) adapters such as a Peripheral Component Interconnect Express (PCIe) adapter that supports Converged Enhanced Ethernet (CEE). Another embodiment of the system 100 may include a multi-root I/O virtualization (MR-IOV) adapter. The network adapters 115 may further be used to implement a Fiber Channel over Ethernet (FCoE) protocol, RDMA over Ethernet, Internet small computer system interface (iSCSI), and the like. In general, a network adapter 115 transfers data using both an Ethernet and PCI based communication method and may be coupled to one or more of the virtual machines 111. In particular, Ethernet may be used as the protocol to the switch fabric, while PCI may be used as the protocol to transfer data to/from main memory to the network adapter 115. Additionally, the adapters may facilitate shared access between the virtual machines 111. While the adapters 115 are shown as being included within the server 105, in other embodiments, the adapters may be physically distinct devices that are separate from the server 105.

In one embodiment, each network adapter 115 may include a converged adapter virtual bridge (not shown) that facilitates data transfer between the adapters 115 by coordinating access to the virtual machines 111. Each converged adapter virtual bridge may recognize data flowing within its domain (i.e., addressable space). A recognized domain address may be routed directly without transmitting the data outside of the domain of the particular converged adapter virtual bridge.

Each network adapter 115 may include one or more Ethernet ports that couple to one of the bridge elements 120, also referred to herein as bridging elements. Additionally, to facilitate PCIe communication, the server may have a PCI Host Bridge 117. The PCI Host Bridge would then connect to an upstream PCI port 122 on a switch element in the distributed network switch 180. The data is then routed via the switching layer 130 to the correct downstream PCI port 123 which may be located on the same or different switch module as the upstream PCI port 122. The data may then be forwarded to the PCI device 150.

The bridge elements 120 may be configured to forward data frames throughout the distributed network switch 180. For example, a network adapter 115 and bridge element 120 may be connected using two 40 Gbit Ethernet connections or one 100 Gbit Ethernet connection. The bridge elements 120 forward the data frames transmitted by the network adapter 115 to the switching layer 130. The bridge elements 120 may include a lookup table that stores address data used to forward the received data frames. For example, the bridge elements 120 may compare address data associated with a received data frame to the address data stored within the lookup table. Thus, the network adapters 115 do not need to know the network topology of the distributed network switch 180.

The distributed network switch 180, in general, includes a plurality of bridge elements 120 that may be located on a plurality of a separate, though interconnected, hardware components. To the perspective of the network adapters 115, the distributed network switch 180 acts like one single switch even though the distributed network switch 180 may be composed of multiple switches that are physically located on different components. Distributing the network switch 180 provides redundancy in case of failure.

Each of the bridge elements 120 may be connected to one or more transport layer modules 125 that translate received data frames to the protocol used by the switching layer 130. For example, the transport layer modules 125 may translate data received using either an Ethernet or PCI communication method to a generic data type (i.e., a cell) that is transmitted via the switching layer 130 (i.e., a cell fabric). Thus, the switch modules comprising the distributed network switch 180 are compatible with at least two different communication protocols—e.g., the Ethernet and PCIe communication standards. That is, at least one switch module has the necessary logic to transfer different types of data on the same switching layer 130.

Although not shown in FIG. 1, in one embodiment, the switching layer 130 may comprise a local rack interconnect (LRI) which connects bridge elements 120 located within the same chassis and rack, as well as links that connect to bridge elements 120 in other chassis and racks.

After routing the cells, the switching layer 130 may communicate with transport layer modules 126 that translate the cells back to data frames that correspond to their respective communication protocols. A portion of the bridge elements 120 may facilitate communication with an Ethernet network 155 which provides access to a LAN or WAN (e.g., the Internet). Moreover, PCI data may be routed to a downstream PCI port 123 that connects to a PCIe device 150. The PCIe device 150 may be a passive backplane interconnect, as an expansion card interface for add-in boards, or common storage that can be accessed by any of the servers connected to the distributed network switch 180.

A second server 106 may include a processor 109 connected to an operating system 107 and memory 110 which includes one or more virtual machines 111 similar to those found in the first server 105. The memory 110 of server 106 also includes a hypervisor 113 with a virtual bridge 114. The hypervisor 113 manages data shared between different virtual machines 111. Specifically, the virtual bridge 114 allows direct communication between connected virtual machines 111 rather than requiring the virtual machines 111 to use the bridge elements 120 or switching layer 130 to transmit data to other virtual machines 111 communicatively coupled to the hypervisor 113.

An Input/Output Management Controller (IOMC) 140 (i.e., a special purpose processor) is coupled to at least one bridge element 120 which provides the IOMC 140 with access to the switching layer 130. One function of the IOMC 140 may be to receive commands from an administrator to configure the different hardware elements of the distributed network switch 180. In one embodiment, these commands may be received from a separate switching network from the switching layer 130.

Although one IOMC 140 is shown, the system 100 may include a plurality of IOMCs 140. In one embodiment, the IOMCs 140 may be arranged in a hierarchy such that one IOMC 140 is chosen as a master while the others are delegated as members.

The distributed network switch 180 may be configured to act as a Fibre Channel Data Forwarder (FCDF) 160, which is a Fibre Channel switching element that is able to forward FCoE frames across one or more switch ports to connected endpoints (i.e., servers 105, 106, storage devices). One example of an FCDF is further described in the Fibre Channel Backbone 6 (FC-BB-6) standard published by T11 working group of the International Committee for Information Technology Standards (INCITS).

In the embodiment shown, the IOMC 140 includes a Fibre Channel Data Forwarder (FCDF) 160. As discussed earlier, FCoE offers the capability to transport fiber channel payloads on top of an Ethernet network. The FCDF 160 may execute a Fiber Channel Initialization Protocol (FIP) to discover and initialize FCoE-capable entities connected within the distributed network switch 180. The FCDF 160 may further include firmware that encapsulates and de-encapsulates Fiber Channel data frames (e.g., FCoE formatted data frames). In at least one embodiment, the FCDF 160 may translate between Ethernet and Fiber Channel protocols. In the embodiment shown, the IOMC 140 is depicted in FIG. 1 having an instance of a FCF 160 that manages execution of FCF functionality across the bridge elements 120 of the distributed network switch 180. In one embodiment, the FCDF 160 may be a distributed Fibre Channel Forwarder where a cFCF provides FC services to a large number of endpoints through many intermediate switches.

Figure 2:
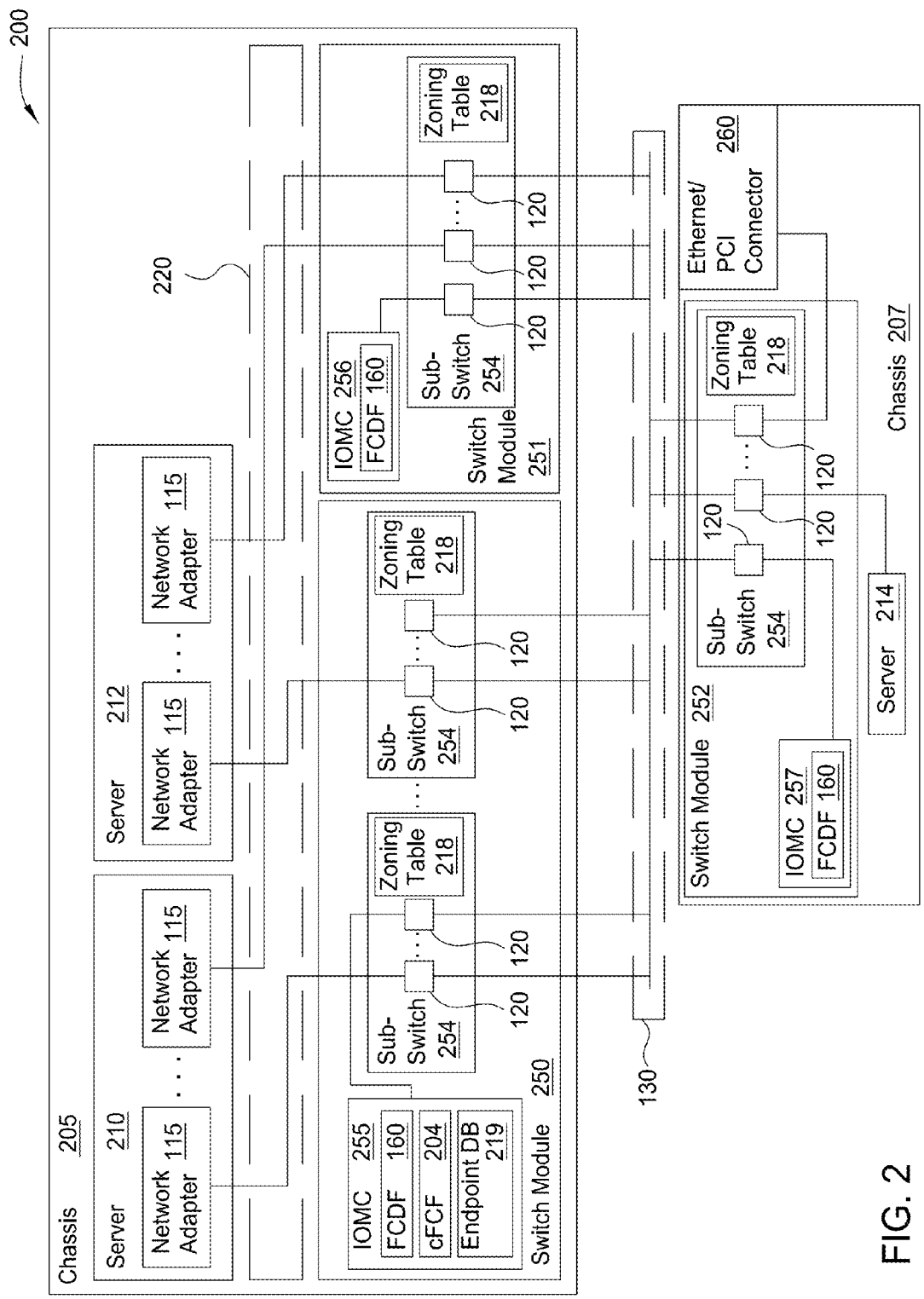
FIG. 2 illustrates a hardware representation of a system that implements the distributed network switch, according to one embodiment disclosed herein.

FIG. 2 illustrates a hardware level diagram of the system 100, according to one embodiment disclosed herein. Server 210 and 212 may be physically located in the same chassis 205; however, the chassis 205 may include any number of servers. The chassis 205 also includes a plurality of switch modules 250, 251 that include one or more sub-switches 254. In one embodiment, the switch modules 250, 251, 252 are hardware components (e.g., PCB boards, FPGA boards, system on a chip, etc.) that provide physical support and connectivity between the network adapters 115 and the bridge elements 120. In general, the switch modules 250, 251, 252 include hardware that connects different chassis 205, 207 and servers 210, 212, 214 in the system 200.

The switch modules 250, 251, 252 (i.e., a chassis interconnect element) include one or more sub-switches 254 and an IOMC 255, 256, 257. The sub-switches 254 may include a logical or physical grouping of bridge elements 120. Each bridge element 120 may be physically connected to the servers 210, 212. For example, a bridge element 120 may route data sent using either Ethernet or PCI communication protocols to other bridge elements 120 attached to the switching layer 130. However, in one embodiment, the bridge element 120 may not be needed to provide connectivity from the network adapter 115 to the switching layer 130 for PCI or PCIe communications.

Each switch module 250, 251, 252 includes an IOMC 255, 256, 257 for managing and configuring the different hardware resources in the system 200. In one embodiment, the respective IOMC for each switch module 250, 251, 252 may be responsible for configuring the hardware resources on the particular switch module. However, because the switch modules are interconnected using the switching layer 130, an IOMC on one switch module may manage hardware resources on a different switch module.

As shown, each IOMC 255, 256, 257 includes an instance of the FCDF 160. In addition, IOMC 255 includes the controlling FCF (cFCF) 204 that controls the set of FCDFs 160. The cFCF 204 defines a control plane for managing the distributed FCF, while the FCDFs 160 define a data plane for forwarding FCoE frames. The cFCF 204 and FCDFs 160 operate together to behave as a single distributed FCF such that a FCoE frame ingressing on a port in one switch module 250, 251, 252 may be routed to egress from a port in any other switch module. From an external point of view (i.e., from the perspective of the server 105), the distributed FCF behaves as an FCF. In particular, the distributed FCF supports instantiation of VN_Port to VF_Port virtual links (not shown) with ENode MAC addresses, and instantiation of VE_Port to VE_Port virtual links (not shown) with FCF-MACs. A "VN_Port" is a Virtual N_Port and refers to a port in an Enhanced Ethernet node (ENode), and a "VF_Port" is a Virtual F_port and refers to a port in an FCoE-capable Ethernet switch. A "VE_Port" is a Virtual E_port and refers to an inter-switch link port. From an internal point of view (i.e., from the perspective of an FCDF 160), the distributed FCF may instantiate VA_Port to VA_Port virtual links to enable FCoE frame forwarding between the cFCF 204 and FCDFs 160, as well as between FCDFs 160. A "VA_Port" is an instance of the FC-2V sublevel of Fibre Channel that connects to another VA_Port, and which is dynamically instantiated together with an FCoE_LEP on successful completion of a FIP ELP Exchange. VA_Port to VA_Port virtual links may also be used to exchange control information between cFCF 204 and FCDFs 160.

As shown, each sub-switch 254 includes a zoning table 218. As previously discussed, the zoning tables 218 are used in making decisions to forward and restrict traffic between endpoints connected to the distributed switch. In one embodiment, the sub-switches 254 may include a zoning table 218 for each pair of ports on the bridge elements 120 in the respective switch module. The zoning tables 218 generally specify a pair of endpoints, such as the servers 210, 212, that may communicate with each other.

As shown, an endpoint database 219 may be managed by the FCDF 160 of the IOMC 255. An endpoint database 219 may reside in each IOMC 255, 256, 257, but is not pictured for the sake of clarity. Generally, the FCDF 160 may populate the endpoint database 219 the WWN of an endpoint, such as the servers 210, 212, as well as a port number of the physical port number the endpoint is connected to. In at least one embodiment, the FCDF 160 creates an entry in the endpoint database 219 when the endpoint sends a login request (which may be an FLOGI request) to the FCDF 160. The FCDF 160 may then forward the login request to the FCDF 204 via the VA port. The cFCF 204, may, responsive to the login request, send a zoning update to the FCDF which includes an FCID for the endpoint. In addition, the zoning update may include zoning data specifying the WWNs of each endpoint the requesting endpoint is permitted to communicate with. In at least one embodiment, the zoning update comprises an N_Port_ID and Zoning ACL Distribution (NPZD). The zoning update may specify the WWN of the requesting endpoint, which the FCDF 160 may use to perform a lookup in the endpoint database 219. The FCDF 160 may update the entry for the requesting endpoint in the endpoint database 219 to include the FCID allocated by the cFCF 204. In addition, the FCDF 160 is able to identify the port number of the physical port of the sub-switch 254 that the endpoint is connected to. In doing so, the FCDF 160 may then update the appropriate zoning table 218 (i.e., the zoning table 218 for the sub-switch 254 hosting the bridge element 120 that the endpoint is connected to) to include the zoning data in the zoning update transmitted by the cFCF 204.

The dotted line in chassis 205 defines the midplane 220 between the servers 210, 212 and the switch modules 250, 251. That is, the midplane 220 includes the data paths that transmit data between the network adapters 115 and the sub-switches 254.

Each bridge element 120 connects to the switching layer 130. In addition, a bridging element 120 may also connect to a network adapter 115 or an uplink. As used herein, an uplink port of a bridging element 120 provides a service that expands the connectivity or capabilities of the system 200. As shown in chassis 207, one bridging element 120 includes a connection to an Ethernet or PCI connector 260. For Ethernet communication, the connector 260 may provide the system 200 with access to a LAN or WAN (e.g., the Internet). Alternatively, the port connector 260 may connect the system to a PCIe expansion slot—e.g., PCIe device 150. The device 150 may be additional storage or memory which each server 210, 212, 214 may access via the switching layer 130. Advantageously, the system 200 provides access to a switching layer 130 that has network devices that are compatible with at least two different communication methods.

As shown, a server 210, 212, 214 may have a plurality of network adapters 115. This provides redundancy if one of these adapters 115 fails. Additionally, each adapter 115 may be attached via the midplane 220 to a different switch module 250, 251, 252. As illustrated, one adapter of server 210 is communicatively coupled to a bridge element 120 located in switch module 250 while the other adapter is connected to a bridge element 120 in switch module 251. If one of the switch modules 250, 251 fails, the server 210 is still able to access the switching layer 130 via the other switching module. The failed switch module may then be replaced (e.g., hot-swapped) which causes the IOMCs 255, 256, 257 and bridging elements 120 to update the routing tables and lookup tables to include the hardware elements on the new switching module.

Figure 3:
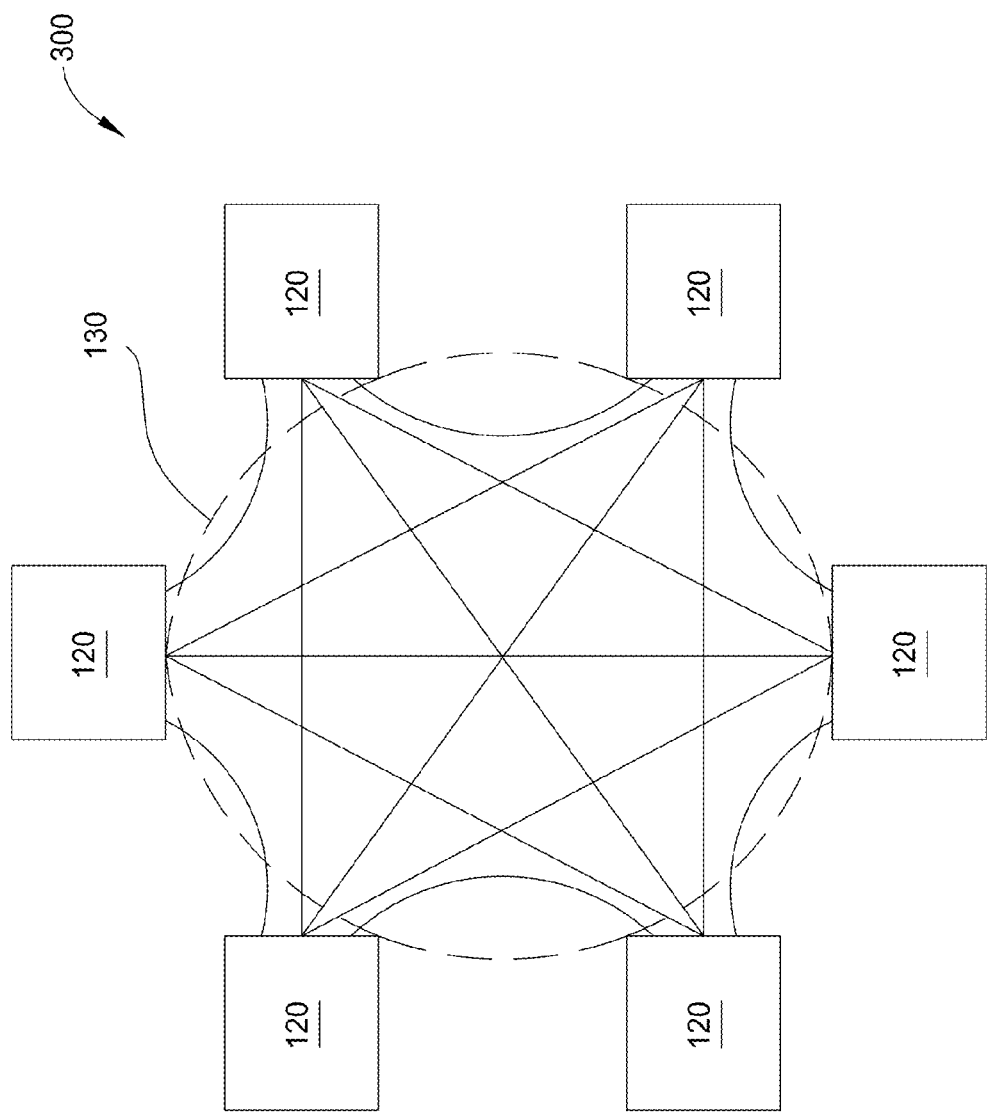
FIG. 3 illustrates components of the distributed network switch, according to one embodiment disclosed herein.

FIG. 3 illustrates a virtual switching layer, according to one embodiment disclosed herein. Each bridging element 120 in the systems 100 and 200 are connected to each other using the switching layer 130 via a mesh connection schema. That is, no matter the bridging element 120 used, a cell (i.e., data packet) can be routed to another bridging element 120 located on any other switch module 250, 251, 252. This may be accomplished by directly connecting each bridging element 120—i.e., each bridging element 120 has a dedicated data path to every other bridging element 120. Alternatively, the switching layer 130 may use a spine-leaf architecture where each bridging element 120 (i.e., a leaf node) is attached to at least one spine node. The spine nodes route cells received from the bridging elements 120 to the correct spine node which then forwards the data to the correct bridging element 120. However, this disclosure is not limited to any particular technique for interconnecting the bridging elements 120.

Accordingly, the distributed network switch disclosed herein is configured to provide Layer 2 Ethernet switching via: multiple switch modules 250, 251, the LRI interconnecting the switch modules 250, 251, and management firmware executing on a management controller such as the IOMC 255, 256, 257. Doing so may eliminate the need for stand-alone Ethernet switches to interconnect processing elements in the servers 105, 106. At least in some embodiments, the networked system may also be augmented in a granular and/or scalable manner by adding individual components such as switch modules and/or processing elements.

In one embodiment, each switch module 250, 251 is operatively connected to multiple bridge elements. In a particular embodiment, each switch module is configured to use five bridge elements, where each bridge element is a distributed Virtual Ethernet Bridge (dVEB) that supports data transfer rates of one hundred gigabits per second (100 Gbps). The dVEBs are managed by firmware executing on the management controller.

Figure 4:
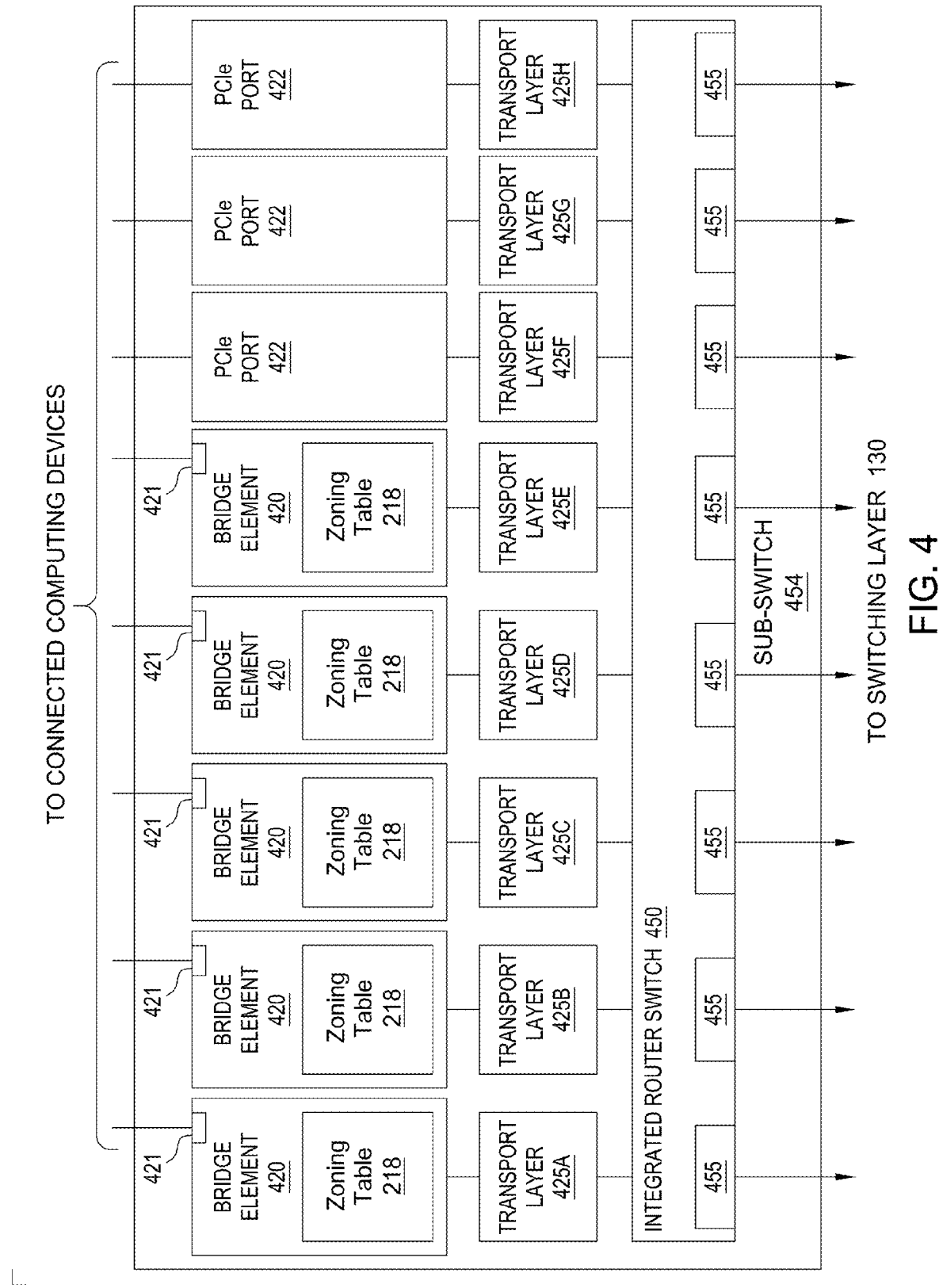
FIG. 4 illustrates a sub-switch of FIG. 2, according to one embodiment disclosed herein.

FIG. 4 illustrates a sub-switch of FIG. 2, according to one embodiment. As shown, sub-switch 454 (i.e., a networking element or device) includes five bridge elements 420 and three PCIe ports 422. However, the present disclosure is not limited to such and can include any number of bridge elements, PCIe ports, or ports for a different communication protocol. Alternatively, the sub-switch 454 may include only bridge elements 420. The bridge elements 420 may contain one or more ports 421 such as, for example, the 100 gigabit port or two 40 gigabit ports discussed previously. Moreover, the present disclosure is not limited to the Ethernet communication protocol but may be applied to any suitable communication method.

Data traffic sent by a connected computing device through one of the ports 421 may include an identifier of the port 421. For example, an FLOGI request may include the identifier of the port 421 the computing device is connected to. The FCDF 160 may populate an entry in the endpoint database 219 which includes the identifier of the port 421 and the WWN of the computing device. The cFCF 204 may respond with a zoning update that specifies an FCID (along with the WWN) for the computing device, according to the SW-6 standard. Upon receiving the zoning update, the FCDF 160 may query its internal endpoint database 219 based on the WWN to find the entry for the computing device. The FCDF 160 may then update the endpoint database 219 entry to include the FCID. The FCDF 160, identifying the port 421 from the endpoint database 219 entry, is able to update the zoning table 218 of the corresponding bridge element 420 of the sub-switch 454 based on the zoning update from the cFCF 204.

Each bridge element 420 and PCIe port 422 is associated with a transport layer (TL) 425. The TLs 425 translate the data received by the bridge element 420 and the PCIe port 422 from their original format (e.g., Ethernet or PCIe) to a generic data packet—i.e., a cell. The TLs 425 also translate cells received from the switching layer 130 back to their respective communication format and then transmits the data to the respective bridge element 420 or PCIe port 422. The bridge element 420 or PCIe port 422 then forwards the translated data to a connected computing device.

The integrated switch router (ISR) 450 is connected to the transport layer and includes connection interfaces 455 (e.g., solder wires, receptacles, ports, cables, etc.) for forwarding the cells to other sub-switches in the distributed switch. In one embodiment, the sub-switch 454 has the same number of interfaces 455 as the TLs 425 though it may have more or less than the number of TLs 425 on the sub-switch 454. In one embodiment, the connection interfaces 455 are "assigned" to one or more of the TLs 425 and a bridge element 420 or PCIe port 422. That is, if the bridge element 420 or PCIe port 422 receives a unicast data frame, it would use the assigned connection interface 455 to forward the data to the switching layer 130.

Although not shown, the ISR 450 may include a crossbar switch that permits the bridge elements 420 and PCIe ports 422 on the same sub-switch 454 to share information directly. The connection interfaces 455 may be connected to the crossbar for facilitating communication between sub-switches. Moreover, portions of the ISR 450 may not be located on an ASIC comprising the sub-switch 454 but may be located external to the sub-switch (e.g., on the switch module).

Figure 5:
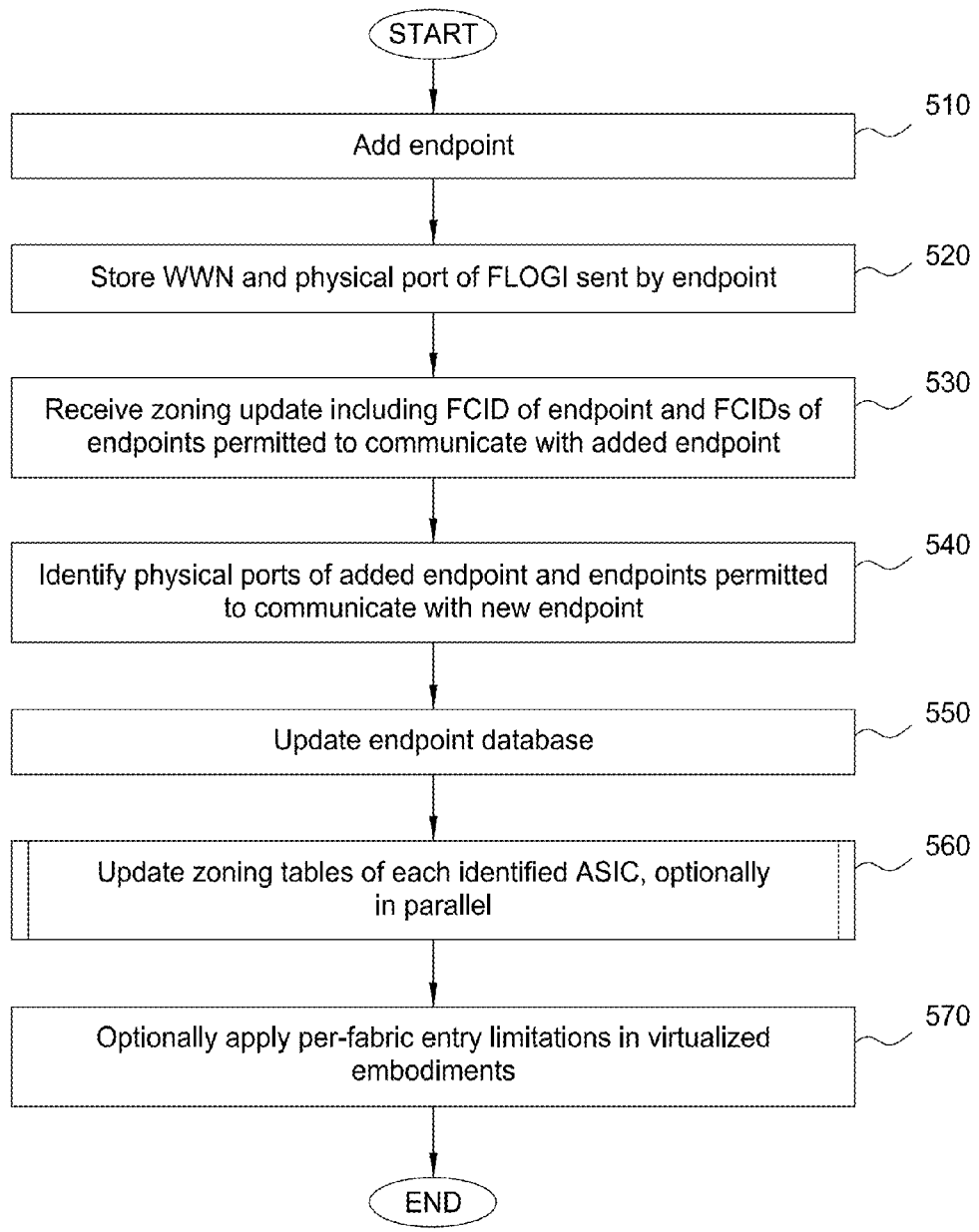
FIG. 5 illustrates a method for Fibre Channel over Ethernet zoning in a distributed Ethernet switch, according to one embodiment.

FIG. 5 illustrates a method 500 for Fibre Channel over Ethernet zoning in a distributed Ethernet switch, according to one embodiment. Generally, the steps of the method 500 provide techniques to update the zoning tables of multiple switch ASICs (also referred to as sub-switches) in a distributed Ethernet switch. At step 510, an endpoint is added to the distributed switch. For example and without limitation, the endpoint may be a server, storage node, or any other computing device. The endpoint may be connected to the distributed switch via a port 421 of a bridge element 420 of a sub-switch 454 (or ASIC) of the distributed switch. At step 520, the FCDF 160 may store the WWN of the endpoint and an identifier (such as port number) of the physical port 421 the endpoint is connected to in the endpoint database 219. The FCDF 160 may receive the WWN and physical source identifier in one or more FLOGI frames sent by the endpoint in order to connect to the distributed Ethernet switch. At step 530, the FCDF 160 may receive a zoning update from the cFCF 204. The zoning update may specify the FCID (and WWN) of the endpoint, as well as zoning information specifying which other endpoints the endpoint added at step 510 may communicate with. In at least one embodiment, the zoning update comprises a Zoning ACL Distribution (NPZD). Based on the WWN of the endpoint received at step 530, the FCDF 160 may, at step 540, identify the physical port of the added endpoint. In addition, the FCDF 160 may identify physical ports of endpoints the added endpoint is permitted to communicate with (as specified in the zoning update).

At step 550, the FCDF 160 may update the entry of the added endpoint in the endpoint database 219 to include the FCID of the added endpoint. At step 560, the FCID 160 may update the relevant zoning tables 218 of each ASIC including the ports identified at step 540. In at least one embodiment, the zoning tables 218 are updated in parallel, as each ASIC can perform one update operation at a given time. In order to do so, the FCDF 160 may split the requests to "add" or "delete" zoning entries in the zoning tables 218 into per-ASIC lists. The FCDF 160 may then process the lists in parallel using a round-robin approach. At step 570, the FCDF 160 may optionally apply per-fabric entry limitations in virtualized embodiments. In virtualized embodiments, the entries of the zoning tables 218 are shared amongst each fabric. Specifically, each fabric may be assigned a specific number of per-fabric entries in the zoning table 218, with the entries being partitioned statistically, with the same number of entries per fabric. Additionally, a free pool of entries may be provided in order to provide additional entries, should the per-fabric entries of a particular fabric be exhausted. An example zoning table 218 for N FCoE fabrics is shown as Table I:

TABLE I

| Free pool of entries |
| --- |
| FCoE Fabric N |
| ... |
| FCoE Fabric 3 |
| FCoE Fabric 2 |
| FCoE Fabric 1 |

Generally, when each FCoE fabric 1-N is started, the fabric consumes entries from its own quota of entries. Once a given fabric exhausts its quota, it may use entries from the free pool of entries, assuming the free pool contains sufficient entries. If the free pool of entries is consumed, an error may be returned indicating sufficient entries do not exist to add to the zoning table 218. Doing so may provide each fabric a guaranteed minimum number of entries while providing the flexibility to allow all (or nearly all) of the entries in the zoning table 218 to be consumed.

Figure 6:
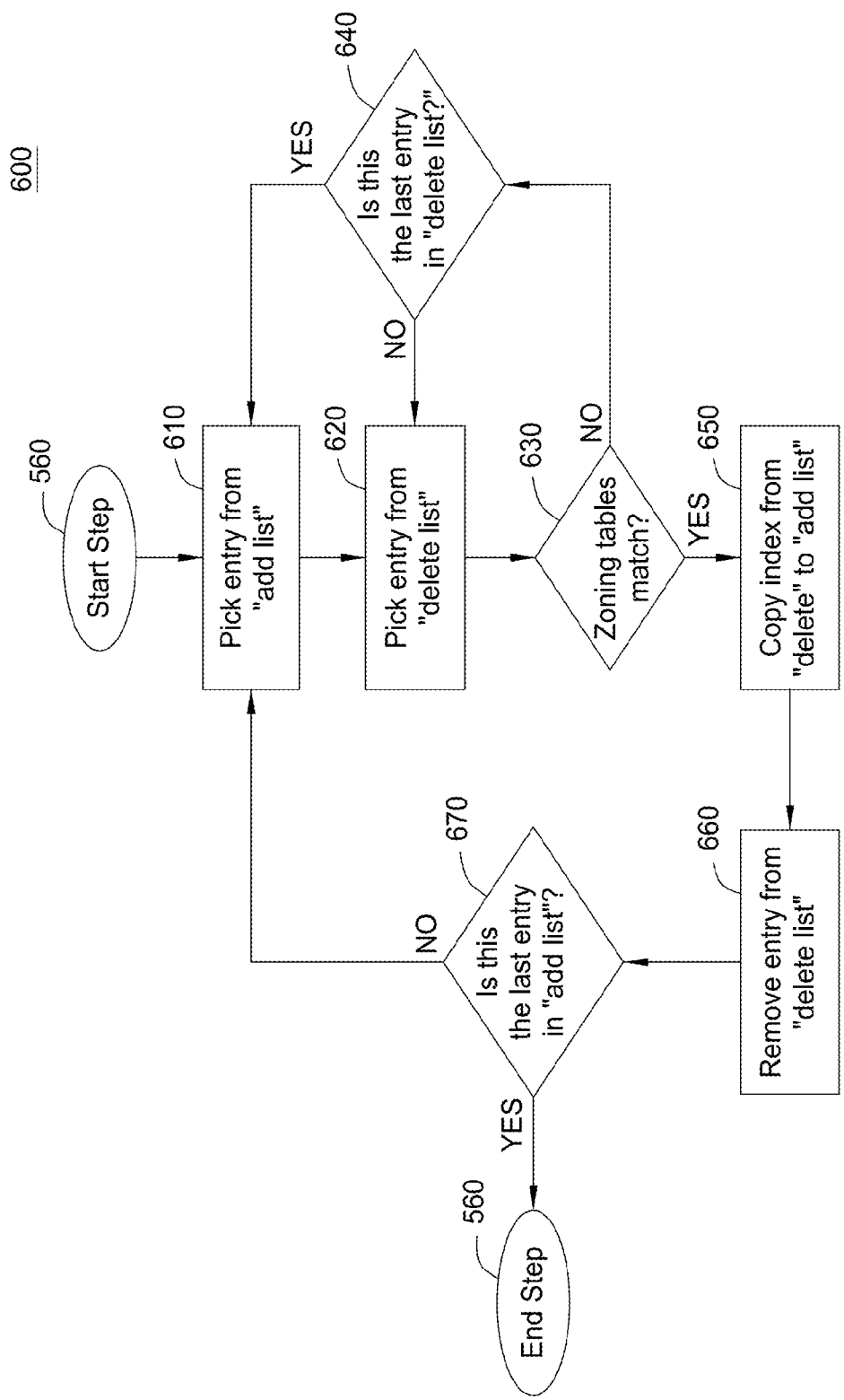
FIG. 6 illustrates a method to update a zoning table of a switch ASIC, according to one embodiment.

FIG. 6 illustrates a method 600 corresponding to step 560 to update a zoning table of a switch ASIC, according to one embodiment. Generally, the steps of the method 600 reduce the number of operations necessary to update the zoning tables 218 with the updated zoning information received from the cFCF 204 at step 540. Specifically, instead of deleting and adding an entry into a single zoning table 218, the method 600 overwrites the entry to be deleted with the new entry to be added, merging the delete and add operations into a single operation. In at least one embodiment, the FCDF 160 may perform the steps of the method 600.

At step 610, the FCDF 160 may select an entry from the "add" list, or list of entries that should be added to the zoning table 218. At step 620, the FCDF 160 may select an entry from the "delete" list, or list of entries that should be deleted from the zoning table 218. At step 630, the FCDF 160 may determine whether the zoning tables 218 for the add and delete entries identified at steps 610 and 620, respectively, are targeted to the same zoning table 218. If the zoning tables 218 do not match, the FCDF 160 proceeds to step 640, where the FCDF 160 determines whether the entry in the "delete" list is the last entry in the delete list (i.e., no more entries remain in the delete list). If more entries remain in the delete list, the FCDF 160 proceeds to step 610, otherwise, the FCDF 160 proceeds to step 620.

Returning to step 630, if the zoning tables match, the FCDF 160 proceeds to step 650. At step 650, the FCDF 160 may copy the index from the delete list to the add list. At step 660, the FCDF 160 may remove the entry from the delete list. At step 670, the FCDF 160 determines whether the current entry from the delete list is the last entry in the delete list. If the current entry from the delete list is not the last entry in the delete list, the FCDF 160 returns to step 610, where it may attempt to merge more add and delete operations. If the current entry from the delete list is the last entry in the delete list, the method 670 ends. Once the delete and add lists have been fully processed, the FCDF 160 may cause the updates to be propagated, optionally in parallel, to each relevant zoning table 218 of each respective ASIC. Once the zoning tables 218 are updated, the endpoints may communicate according to the updated zoning entries in the zoning tables 218.

Advantageously, embodiments disclosed herein provide techniques to update zoning tables in multiple switch ASICs in a distributed Ethernet switch. By storing port and WWN information received in an FLOGI request in an endpoint database, an FCDF may identify the relevant port (and ASIC) by performing a lookup based on the WWN when a zoning update is received from the cFCF. The FCDF may then cause the appropriate zoning tables to be updated to include the most current zoning entries.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A system, comprising:
a computer processor; and
a memory containing a program, which when executed by the computer processor, is configured to perform an operation comprising:
receiving a login request from an endpoint connected to a first physical port of a first switch module of a distributed network switch, wherein the distributed network switch comprises a plurality of switch modules, wherein each switch module comprises a plurality of application-specific integrated circuits (ASICs),
in response to the login request, storing, in a Fibre Channel Data Forwarder (FCDF) database, an entry comprising an identifier of the first physical port and a unique identifier of the endpoint, and
responsive to receiving, from a controlling Fibre Channel Forwarder (cFCF), a zoning update comprising the unique identifier of the endpoint and a Fibre Channel Identifier (FCID) for the endpoint:
storing the FCID in the FCDF database entry for the endpoint;
identifying a first ASIC, of the plurality of ASICs of the first switch module, connected to the first physical port; and
updating a zoning table of the first ASIC to include the zoning update.

2. The system of claim 1, wherein each ASIC of each switch module includes a zoning table for each physical port connected to each ASIC, wherein each zoning table comprises a plurality of entries specifying a pair of endpoints permitted to communicate, and wherein the plurality of entries specifies a respective FCID of each endpoint.

3. The method of claim 1, wherein a plurality of zones are defined in the distributed network switch, wherein the endpoint is a member of the first zone, of the plurality of zones.

4. The system of claim 1, wherein updating the zoning table comprises:
identifying a first zoning entry to add to the zoning table; and
upon determining that a second zoning entry in the zoning table is to be deleted from the zoning table, overwriting the second zoning entry with the first zoning entry.

5. The system of claim 1, the operation further comprising:
identifying, in the zoning update, a second endpoint permitted to communicate with the first endpoint, wherein the second endpoint is connected to a second physical port of at least one of: (i) the first switch module, and (ii) a second switch module; and
updating the zoning table of a second ASIC of the second physical port to reflect that the endpoint is permitted to communicate with the second endpoint.

6. The system of claim 5, wherein the zoning tables of the first and second ASICs are updated in parallel.

7. The system of claim 1, wherein the login request comprises a fabric login (FLOGI) frame, wherein the zoning update comprises an N_Port_ID and Zoning ACL Distribution (NPZD).

8. A computer program product, comprising:
a non-transitory computer-readable medium having computer-readable program code embodied therewith, the computer-readable program code comprising:
computer-readable program code configured to, receive a login request from an endpoint connected to a first physical port of a first switch module of a distributed network switch, wherein the distributed network switch comprises a plurality of switch modules, wherein each switch module comprises a plurality of application-specific integrated circuits (ASICs);
computer-readable program code configured to, in response to the login request, store, in a Fibre Channel Data Forwarder (FCDF) database, an entry comprising an identifier of the first physical port and a unique identifier of the endpoint; and
computer-readable program code configured to, responsive to receiving, from a controlling Fibre Channel Forwarder (cFCF), a zoning update comprising the unique identifier of the endpoint and a Fibre Channel Identifier (FCID) for the endpoint:
store the FCID in the FCDF database entry for the endpoint,
identify a first ASIC, of the plurality of ASICs of the first switch module, connected to the first physical port, and
update a zoning table of the first ASIC to include the zoning update.

9. The non-transitory computer-readable medium of claim 8, wherein each ASIC of each switch module includes a zoning table for each physical port connected to each ASIC, wherein each zoning table comprises a plurality of entries specifying a pair of endpoints permitted to communicate, and wherein the plurality of entries specifies a respective FCID of each endpoint.

10. The non-transitory computer-readable medium of claim 8, wherein a plurality of zones are defined in the distributed network switch, wherein the endpoint is a member of a first zone, of the plurality of zones.

11. The computer-readable medium of claim 8, wherein updating the zoning table comprises:
identifying a first zoning entry to add to the zoning table; and
upon determining that a second zoning entry in the zoning table is to be deleted from the zoning table, overwriting the second zoning entry with the first zoning entry.

12. The non-transitory computer-readable medium of claim 8, further comprising:

computer-readable program code configured to identify, in the zoning update, a second endpoint permitted to communicate with the first endpoint, wherein the second endpoint is connected to a second physical port of at least one of: (i) the first switch module, and (ii) a second switch module; and computer-readable program code configured to update the zoning table of a second ASIC of the second physical port to reflect that the first and point endpoint is permitted to communicate with the second endpoint.

13. The non-transitory computer-readable medium of claim 12, wherein the zoning tables of the first and second ASICs are updated in parallel, wherein the login request comprises an fabric login (FLOGI) frame, wherein the zoning update comprises an N_Port_ID and Zoning ACL Distribution (NPZD).

* * * * *